United States Patent
Jo

(10) Patent No.: US 9,855,806 B1
(45) Date of Patent: Jan. 2, 2018

(54) CARRIER FOR SUSPENSION SYSTEM OF VEHICLES

(71) Applicant: Hyundai Motor Company, Seoul (KR)

(72) Inventor: Gibong Jo, Seoul (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 15/365,811

(22) Filed: Nov. 30, 2016

(30) Foreign Application Priority Data

Jul. 12, 2016 (KR) .......................... 10-2016-0088252

(51) Int. Cl.
*B60G 3/00* (2006.01)
*B60G 3/20* (2006.01)

(52) U.S. Cl.
CPC ................ *B60G 3/00* (2013.01); *B60G 3/20* (2013.01); *B60G 2200/1442* (2013.01); *B60G 2204/148* (2013.01); *B60G 2204/40* (2013.01)

(58) Field of Classification Search
CPC .......................... B60G 2204/148; B60G 3/20
See application file for complete search history.

(56) References Cited

U.S. PATENT DOCUMENTS

| | | | |
|---|---|---|---|
| 7,431,315 B2 | 10/2008 | Jargowsky et al. | |
| 9,162,546 B2 | 10/2015 | Girelli Consolaro et al. | |
| 9,409,457 B2 * | 8/2016 | Gielisch | B60G 3/145 |
| 9,463,677 B2 * | 10/2016 | Czerr | B60G 3/202 |
| 9,555,682 B2 * | 1/2017 | Peitz | B60G 7/001 |
| 2014/0353937 A1 * | 12/2014 | Girelli Consolaro | B60G 21/0551 280/124.128 |
| 2015/0343868 A1 * | 12/2015 | Stenzenberger | B60G 3/285 280/124.11 |
| 2015/0375588 A1 * | 12/2015 | Czerr | B60G 3/202 280/124.135 |

FOREIGN PATENT DOCUMENTS

| | | | |
|---|---|---|---|
| CN | 202783361 U | 3/2013 | |
| DE | 103 36 798 A1 | 3/2005 | |
| DE | 103 46 280 A1 | 5/2005 | |
| DE | 10 2010 011 487 A1 | 9/2011 | |
| DE | 102011110981 A1 * | 2/2013 | B60G 3/20 |
| EP | 2 251 217 A1 | 11/2010 | |
| EP | 2614969 B1 | 10/2014 | |
| WO | WO-2012139857 A1 * | 10/2012 | B60G 3/18 |
| WO | WO-2014082465 A1 * | 6/2014 | B60G 3/20 |

* cited by examiner

*Primary Examiner* — Nicole T Verley
(74) *Attorney, Agent, or Firm* — Morgan, Lewis & Bockius LLP

(57) ABSTRACT

A carrier for suspension system of vehicles may include wheel bearing mounting part configured to have center provided with through hole, outside circumferential surface of the through hole being provided with at least one fastening hole; upper arm mounting part configured to be formed at upper portion of the wheel bearing mounting part and fastened with upper arm; lower arm mounting part configured to be integrally formed at one side toward rear of the vehicle from lower portion of the wheel bearing mounting part; reinforcing part configured to be extended from the wheel bearing mounting part to front of the vehicle; trailing arm mounting part configured to be integrally connected to the reinforcing part and fastened with trailing arm; and assist arm mounting part configured be integrally formed at lower portion of the flat extending end and fastened with assist arm.

7 Claims, 3 Drawing Sheets

1

CARRIER FOR SUSPENSION SYSTEM OF VEHICLES

CROSS-REFERENCE TO RELATED APPLICATION

The present application claims priority to and the benefit of Korean Patent Application No. 10-2016-0088252 filed on Jul. 12, 2016, the entire contents of which are incorporated herein by reference.

BACKGROUND OF THE INVENTION

Field of the Invention

The present invention relates to a carrier for a suspension system of vehicles, and more particularly, to a carrier for a suspension system of vehicle configured for improving fastening stiffness with a plurality of arms connected to a vehicle body.

Description of Related Art

Generally, a suspension system of vehicles is installed between a vehicle body and a wheel to connect between the vehicle body and the wheel using one or a plurality of arms.

Generally, the suspension system is elastically supported by a spring and a shock absorber, or the like to serve to mechanically harmonize a relative motion between the vehicle body and the wheel.

The suspension effectively blocks an irregular input on a road surface occurring while a vehicle is being driven to provide easy ride comfort to a passenger. Further, the suspension appropriate controls a shaking of the vehicle body that occurs due to a driving behavior of a driver and roughness of a road surface to provide driving convenience.

That is, the suspension needs to meet basic conditions that a vertical load of a tire should be maintained at an appropriate level when a vehicle is driving an irregular road surface and vehicle stability should be assured at the time of cornering and braking.

The above-mentioned suspension may be divided into an axle suspension type in which left and right wheels are connected to each other by one axle and an independent suspension type in which left and right wheels move separately.

In this case, as the independent suspension type, a wishbone type, a MacPherson strut type, a multi link type, or the like have been mainly used.

The wishbone type consists of upper and lower control arms, a carrier, a coil spring, or the like and thus the wheel moves up and down while being buffered by the spring.

That is, the wishbone type has a structure in which both of a braking force and a cornering force that are generated at the wheel in the above-mentioned types are supported by a control arm and the spring supports only the vertical load.

Further, the MacPherson strut type is integrally formed with the carrier and is configured of a strut and ball joint having the shock absorber provided therein, the control arm, the spring, or the like.

The MacPherson strut type may have a simpler structure, a smaller number of components, and a more reduced load of the spring than the wishbone type. Accordingly, the MacPherson strut type may improve the ride comfort of the vehicle and increase an available space of an engine compartment.

Further, the above-mentioned multi link type is configured of several arms. The multi link type may be configured by adding an auxiliary arm to the wishbone type. Therefore, the multi link type may have high design freedom, adjust geometry characteristics at the time of cornering, and improve ride comfort and driving stability.

The multi link type connects between several arms and the wheel by one carrier. Here, the carrier supports the load of each arm.

Therefore, the carrier needs to have stiffness that may bear the load by each arm, and as a result, research and development therefor is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a carrier for a suspension system of vehicle having advantages of improving stiffness of connected parts connected to the respective arms by applying a flat extending end extending from a wheel bearing mounting part where a wheel bearing is mounted toward a front of the vehicle and connecting the flat extending end up to a first side of a trailing arm mounting part where a trailing arm is mounted.

Various aspects of the present invention are directed to providing a carrier for a suspension system of vehicle rotatably supporting a wheel to connect between a plurality of arms connected to a rear wheel side vehicle body and a wheel, including: a wheel bearing mounting part configured to have a center provided with a through hole, an outside circumferential surface of the through hole being provided with at least one fastening hole; an upper arm mounting part configured to be formed at an upper portion of the wheel bearing mounting part and fastened with an upper arm; a lower arm mounting part configured to be integrally formed at a first side toward a rear of the vehicle from a lower portion of the wheel bearing mounting part; a flat reinforcing part configured to be extended from the wheel bearing mounting part to a front of the vehicle; a trailing arm mounting part configured to be integrally connected to the flat reinforcing part and fastened with a trailing arm; and an assist arm mounting part configured be integrally formed at a lower portion of the flat extending end and fastened with an assist arm.

The flat reinforcing part may connect the trailing arm mounting part from the wheel bearing mounting part and may be formed to have a thicker thickness from the trailing arm mounting part toward the wheel bearing mounting part.

The flat reinforcing part may be formed in a same width length as a thickness of the wheel bearing mounting part and may be formed to be inclined upward from the trailing arm mounting part toward the wheel bearing mounting part.

The upper arm mounting part may be formed in a fork shape so that an upper arm bush unit mounted at the upper arm is mounted.

The lower arm mounting part may be integrally formed with a mounting bush.

The assist arm mounting part may be formed in a fork shape so that an assist arm bush unit mounted at the upper arm is mounted.

The assist arm mounting part may be formed to correspond to a tip portion of the flat reinforcing part positioned toward a front of the vehicle.

According to an exemplary embodiment of the present invention, it is possible to improve the stiffness of the connected portions between the respective arms by applying the flat reinforcing part between the trailing arm mounting parts extending from the wheel bearing mounting part at which the wheel bearing is mounted toward a front of the vehicle.

Further, the effects which may be obtained or predicted by the exemplary embodiment of the present invention will be explicitly or implicitly disclosed in the DETAILED DESCRIPTION of the present invention. That is, various effects which are predicted by the exemplary embodiments of the present invention will be disclosed in the detailed description to be described below.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
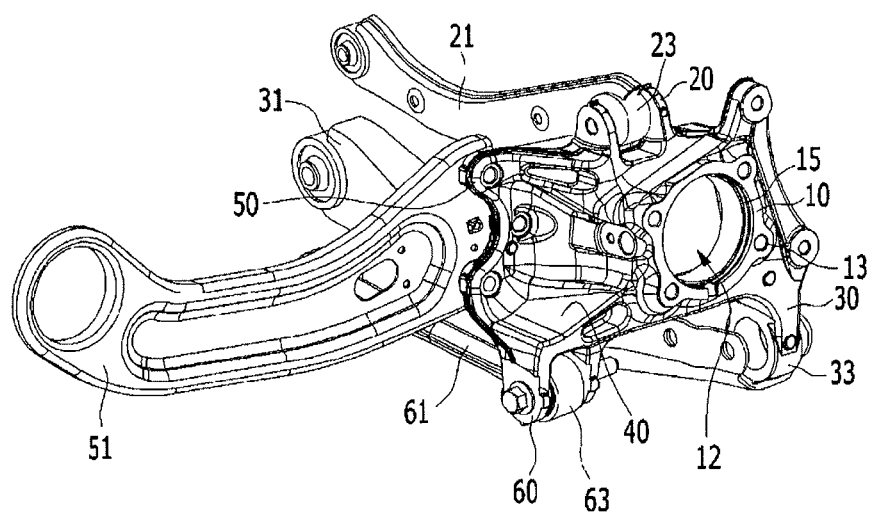
FIG. 1 is a schematic diagram of a carrier for a suspension system of vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
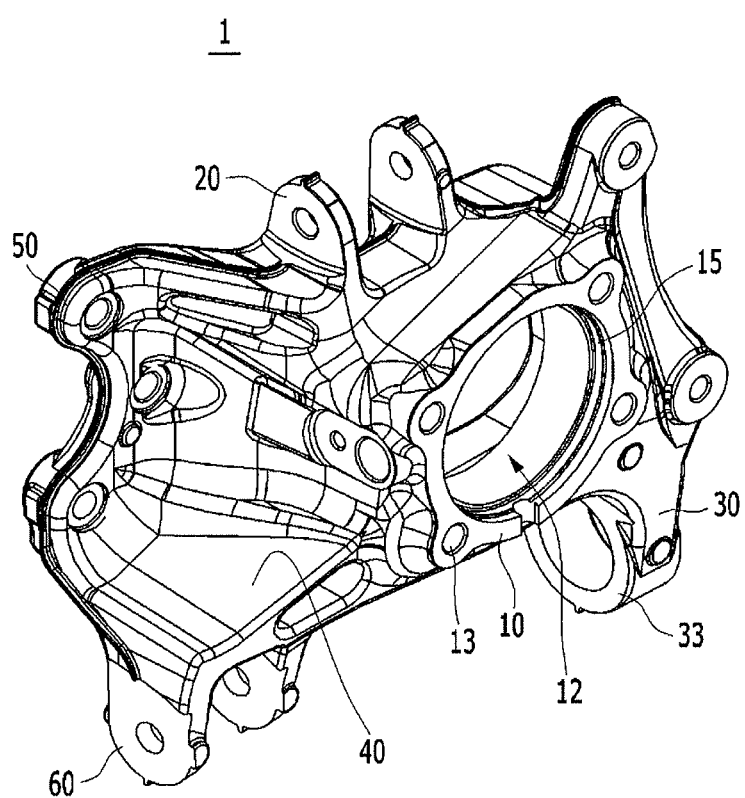
FIG. 2 is a perspective view of the carrier for a suspension system of vehicle according to the exemplary embodiment of the present invention.
Figure 3:
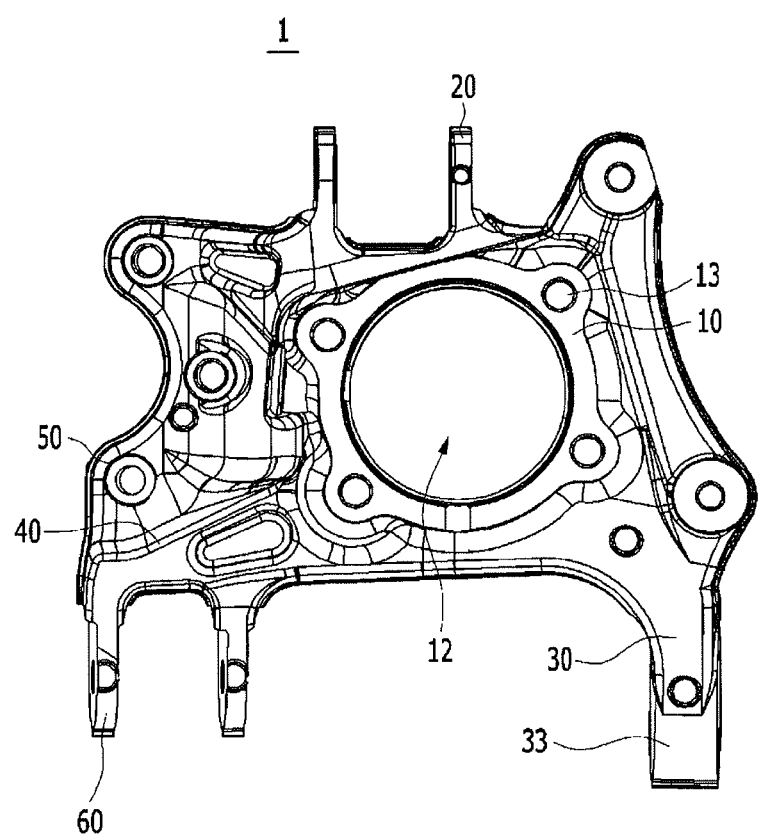
FIG. 3 is a front view of the carrier for a suspension system of vehicle according to the exemplary embodiment of the present invention.

FIG. 1 is a schematic diagram of a carrier for a suspension system of vehicles according to an exemplary embodiment of the present invention, FIG. 2 is a perspective view of the carrier for a suspension system of vehicles according to the exemplary embodiment of the present invention, and FIG. 3 is a front view of the carrier for a suspension system of vehicles according to the exemplary embodiment of the present invention.

Referring to FIGS. FIG. 1 and FIG. 2, as a carrier 1 for a suspension system of vehicles (hereinafter, referred to carrier) according to an exemplary embodiment of the present invention, a carrier for a rear wheel dual lower arm suspension system will be described as an example.

Here, the dual lower arm suspension system is a multi link type suspension system in which two arms are connected to a lower portion with respect to the carrier 1.

The carrier 1 rotatably supports the wheel to connect between a plurality of arms connected to a rear wheel side vehicle body and a wheel.

The carrier 1 is configured of a wheel bearing mounting part 10, an upper arm mounting part 20, a lower arm mounting part 30, a flat reinforcing part 40, a trailing arm mounting part 50, and an assist arm mounting part 60.

First, the wheel bearing mounting part 10 has a center provided with a through hole 12 for mounting a wheel bearing, in which an outside circumferential surface of the through hole 12 is provided with at least one fastening hole 13.

Four fastening holes 13 may be formed at positions where they are spaced apart from each other at a predetermined angle with respect to the through hole 12 and the fastening hole 13 is =mounted with a knuckle.

Further, an inner circumferential surface of the wheel bearing mounting part 10 is provided with a step part 15.

When the wheel bearing is mounted in the through hole 12, the step part 15 prevents the wheel bearing from being separated from the through hole 12.

Further, the upper arm mounting part 20 is formed at an upper portion of the wheel bearing mounting part 10 and fastened with an upper arm 21.

The upper arm mounting part 20 has a fork shape so that the upper arm bush unit 23 mounted at the upper arm 21 is mounted.

That is, the upper arm mounting part 20 includes two flanges that are formed at a first side and a second side with respect to a front and rear direction of the vehicle. The upper arm bush units 23 are inserted between the respective flanges and are bolt-fastened with each other.

Further, the lower arm mounting part 30 is integrally formed at a first side toward a rear of the vehicle from a lower portion of the wheel bearing mounting part 10 and is fastened with a lower arm 31.

Here, the lower arm mounting part 30 is integrally formed with a ring-shaped mounting bush 33.

The mounting bush 33 may more smoothly mount the lower arm 31 when the lower arm mounting part 30 is mounted with the lower arm 31.

According to the exemplary embodiment of the present invention, the flat reinforcing part 40 extends from the wheel bearing mounting part 10 toward a front of the vehicle.

Here, as illustrated in FIG. 3, the flat reinforcing part 40 connects between the wheel bearing mounting part 10 and the trailing arm mounting part 50.

Further, the flat reinforcing part 40 may be formed to have a thicker thickness from the trailing arm mounting part 50 toward the wheel bearing mounting part 10.

That is, the flat reinforcing part 40 is formed in a same width length as a thickness of the wheel bearing mounting part 10. The flat reinforcing part 40 may be formed to be inclined upward from the trailing arm mounting part 50 toward the wheel bearing mounting part 10.

According to the exemplary embodiment of the present invention, the trailing arm mounting part 50 is integrally connected with the flat reinforcing part 40 and is fastened with a trailing arm 51.

Further, the assist arm mounting part 60 is integrally formed at the lower portion of the flat reinforcing part 40 and is fastened with an assist arm 61.

In the instant case, the assist arm mounting part 60 is formed in a fork shape so that the assist arm bush unit 63 mounted at the assist arm 61 is mounted, like the upper arm mounting part 20.

That is, the assist arm mounting part 60 includes two flanges that are formed at a first side and a second side with respect to the front and rear direction of the vehicle. The assist arm bush units 63 are inserted between the respective flanges and are bolt-fastened with each other.

The assist arm mounting part 60 may be formed to correspond to a tip portion of the flat reinforcing part 40 that is positioned toward a front of the vehicle.

Meanwhile, the exemplary embodiment of the present invention describes as an example that the assist arm mounting part 60 is formed to correspond to the tip portion of the flat reinforcing part 40 but is not limited thereto and therefore the position of the assist arm mounting part 60 may be changed and applied depending on the mounting position of the assist arm 61.

Therefore, the carrier 1 for a suspension system of vehicle according to the exemplary embodiment of the present invention applies the flat reinforcing part 40 between the trailing arm mounting parts 50 extending from the wheel bearing mounting part 10 where the wheel bearing is mounted toward a front of the vehicle, improving the stiffness at the connected portions between the respective arms.

Meanwhile, the carrier 1 for a suspension system of vehicle according to the exemplary embodiment of the present invention describes as an example in which the wheel bearing mounting part 10, the trailing arm mounting part 50, and the assist arm mounting part 60 are connected to each other through the flat reinforcing part 40 to improve the stiffness of the connected part but is not limited thereto and therefore the respective arm mounting parts including the assist arm mounting part 60 may have a connection structure through the flat reinforcing part 40.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A carrier for a suspension system of a vehicle rotatably supporting a wheel to connect between a plurality of arms connected to a rear wheel side vehicle body and a wheel, comprising:
   a wheel bearing mounting part configured to have a center provided with a through hole, an outside circumferential surface of the through hole being provided with at least one fastening hole;
   an upper arm mounting part configured to be formed at an upper portion of the wheel bearing mounting part and fastened with an upper arm;
   a lower arm mounting part configured to be integrally formed at a first side toward a rear of the vehicle from a lower portion of the wheel bearing mounting part;
   a reinforcing part configured to be extended from the wheel bearing mounting part to a front of the vehicle;
   a trailing arm mounting part configured to be integrally connected to the reinforcing part and fastened with a trailing arm; and
   an assist arm mounting part configured be integrally formed at a lower portion of a flat extending end and fastened with an assist arm,
   wherein the reinforcing part connects the trailing arm mounting part from the wheel bearing mounting part, and is formed to have a thicker thickness from the trailing arm mounting part toward the wheel bearing mounting part.

2. The carrier of claim 1, wherein the reinforcing part is formed in a same width length as a thickness of the wheel bearing mounting part, and is formed to be inclined upward from the trailing arm mounting part toward the wheel bearing mounting part.

3. The carrier of claim 1, wherein the upper arm mounting part is formed in a fork shape so that an upper arm bush unit mounted at the upper arm is mounted.

4. The carrier of claim 1, wherein the lower arm mounting part is integrally formed with a mounting bush.

5. The carrier of claim 1, wherein the assist arm mounting part is formed in a fork shape and an assist arm bush unit mounted at the upper arm is mounted at the assist arm mounting part.

6. The carrier of claim 1, wherein the assist arm mounting part is formed to correspond to a tip portion of the reinforcing part positioned toward a front of the vehicle.

7. A carrier for a suspension system of a vehicle rotatably supporting a wheel to connect between a plurality of arms connected to a rear wheel side vehicle body and a wheel, comprising:
   a wheel bearing mounting part configured to have a center provided with a through hole, an outside circumferential surface of the through hole being provided with at least one fastening hole;
   an upper arm mounting part configured to be formed at an upper portion of the wheel bearing mounting part and fastened with an upper arm;
   a lower arm mounting part configured to be integrally formed at a first side toward a rear of the vehicle from a lower portion of the wheel bearing mounting part;
   a reinforcing part including to be a flat surface and extended from the wheel bearing mounting part to a front of the vehicle;
   a trailing arm mounting part configured to be integrally connected to the reinforcing part and fastened with a trailing arm; and an assist arm mounting part configured be integrally formed at a lower surface of the flat reinforcing part and fastened with an assist arm.

\* \* \* \* \*